J. G. GOOD.
Manure Fork.
No. 63,878.
Patented April 16, 1867.
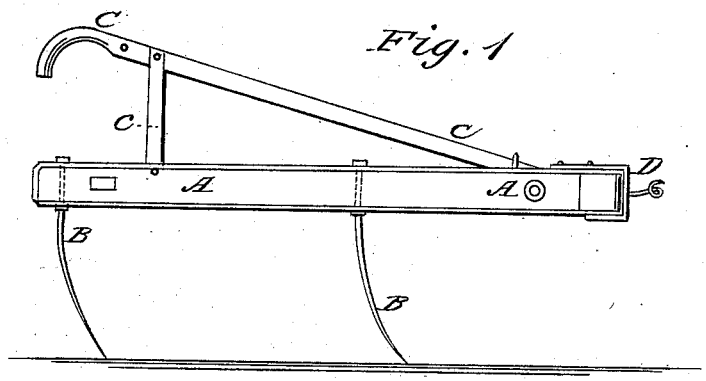
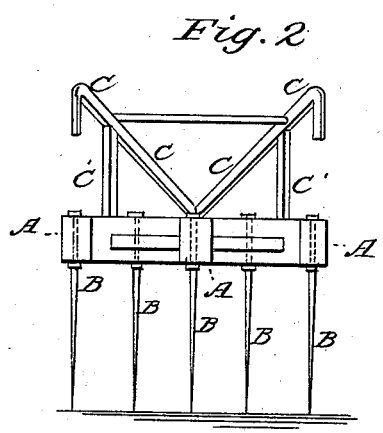

United States Patent Office.

JACOB G. GOOD, OF RAPS, PENNSYLVANIA.

Letters Patent No. 63,878, dated April 16, 1867.

IMPROVEMENT IN DUNG-HOOK.

The Schedule referred to in these Letters Patent and making part of the same.

TO ALL WHOM IT MAY CONCERN:

Be it known that I, JACOB G. GOOD, of Raps, in the county of Lancaster, and State of Pennsylvania, have invented a new and improved Dung-Hook; and I do hereby declare that the following is a full, clear, and exact description thereof, which will enable others skilled in the art to make and use the same, reference being had to the accompanying drawings, forming part of this specification, in which—

Figure 1 is a side view of my improved hook.

Figure 2 is a rear end view of the same.

Similar letters of reference indicate like parts.

My invention has for its object to furnish an improved hook, by means of which the dung and bedding may be easily and expeditiously drawn out of stables; and it consists in an improved dung-hook, constructed and arranged in the manner hereinafter more fully described.

A is the frame of the hook, consisting of three beams, meeting at an angle at the forward end of said frame, and secured to each other and held in their proper relative positions by one or more cross-bars, as may be desired or necessary. To the frame A are attached five teeth or hooks B, two in front to keep the mass of manure to which the hook is attached from doubling back, and three in the rear to keep the said mass from breaking apart. The hooks or teeth B are made in about the form shown in fig. 1, and their upper ends are securely attached to the beams A. C are the handles, the forward ends of which are securely attached to the forward end of the frame A, and their rear ends are connected to the rear part of the said frame by the uprights $e'$, as shown in figs. 1 and 2. The handles C are so made as to extend back no farther than the frame A extends, so that the rear end of the machine may be placed close up to the wall or partition of the stable. D is the draught-hook, which is swivelled to the forward end of the frame A, so that the machine may be easily turned in any direction required in operating it. In using the machine a whiffle-tree is hooked upon the swivel-hook D, and a horse, mule, or ox attached thereto. The machine is then drawn into the stable, being turned over so as to run upon one corner of the frame A, or, being turned hooks upward, so as to run upon the handles. Upon reaching the desired place it is turned right side up, and the hooks B thrust down through the manure to the ground or floor of the stable, and drawn out, carrying with it as much manure as a horse can draw. Upon reaching the place where the manure is to be deposited, by giving the hook a smart jerk, and, at the same time, turning it over, it will be separated from its load. The size of the machine will depend upon the width of the stable doors through which it is to be drawn, and the extent of the stables for cleaning which it is to be used.

I claim as new, and desire to secure by Letters Patent—

An improved dung-hook, constructed substantially in the manner herein shown and described, and for the purpose set forth.

The above specification of my invention signed by me this 14th day of February, 1867.

JACOB G. GOOD.

Witnesses:
C. M. MARTIN,
JOHN MYERS.